United States Patent [19]
Larky et al.

[11] Patent Number: 6,105,097
[45] Date of Patent: Aug. 15, 2000

[54] DEVICE AND METHOD FOR INTERCONNECTING UNIVERSAL SERIAL BUSES INCLUDING POWER MANAGEMENT

[75] Inventors: Steven P. Larky, Del Mar; Scott Swindle; John Boynton, both of San Diego, all of Calif.

[73] Assignee: Cypress Semiconductor Corp., San Jose, Calif.

[21] Appl. No.: 09/172,956

[22] Filed: Oct. 14, 1998

[51] Int. Cl.[7] .............................. G06F 13/00; G06F 13/38
[52] U.S. Cl. .................... 710/129; 710/128; 713/300; 713/310; 713/320; 713/322; 713/323; 713/324; 713/340
[58] Field of Search ................................. 710/128, 129; 713/320, 322, 323, 324, 340, 310

[56] References Cited

U.S. PATENT DOCUMENTS

| | | | |
|---|---|---|---|
| 4,866,606 | 9/1989 | Kopetz | 364/200 |
| 4,890,222 | 12/1989 | Kirk | 364/200 |
| 5,388,249 | 2/1995 | Hotta et al. | 395/550 |
| 5,392,421 | 2/1995 | Lennartsson | 395/550 |
| 5,402,394 | 3/1995 | Turski | 368/10 |
| 5,461,723 | 10/1995 | Shah et al. | 395/293 |
| 5,621,902 | 4/1997 | Cases et al. | 395/309 |
| 5,628,001 | 5/1997 | Cepuran | 395/556 |
| 5,630,147 | 5/1997 | Datta et al. | 395/750 |
| 5,642,489 | 6/1997 | Bland et al. | 395/308 |
| 5,675,813 | 10/1997 | Holmdahl | 395/750 |
| 5,748,911 | 5/1998 | Maguire et al. | 395/281 |
| 5,748,923 | 5/1998 | Eitrich | 395/309 |
| 5,754,799 | 5/1998 | Hiles | 395/290 |
| 5,767,844 | 6/1998 | Stoye | 345/212 |
| 5,774,744 | 6/1998 | Story et al. | 395/847 |
| 5,778,218 | 7/1998 | Gulick | 395/558 |
| 5,781,028 | 7/1998 | Decuir | 326/30 |
| 5,852,370 | 12/1998 | Ko | 326/81 |
| 5,871,368 | 2/1999 | Erdner et al. | 439/188 |
| 5,884,086 | 3/1999 | Amoni et al. | 713/300 |
| 5,938,770 | 8/1999 | Kim | 713/300 |

OTHER PUBLICATIONS

Universal Serial Bus Specification, Revision 1.0, Jan. 15, 1996, pp. 1–267.
Intel USB Mobile System Design Guidelines, Revision 1.0, Nov. 6, 1996, pp. 1–19.
Universal Serial Bus and the Multimedia PC, by Kosar A. Jaff, 1996, pp. 1–9.
Intel USB Voltage Drop and Droop Measurement, Nov. 18, 1996, pp. 1–19.

*Primary Examiner*—Ayaz R. Sheikh
*Assistant Examiner*—Frantz Blanchard Jean
*Attorney, Agent, or Firm*—Christopher P. Maiorana, P.C.

[57] ABSTRACT

A device and method for interconnecting two universal serial buses (USBs) is provided in which the device controls the current supplied to the device from the USBs via a power manager. In particular, when one or both of the buses connected to the device enter a suspended state, the power manager reduces the current consumed by the device so that the device does not exceed a maximum suspend current. The device may also have a power manager controller which permits one or both device drivers connected to the USBs to control the power manager.

20 Claims, 5 Drawing Sheets

DEVICE AND METHOD FOR INTERCONNECTING UNIVERSAL SERIAL BUSES INCLUDING POWER MANAGEMENT

BACKGROUND OF THE INVENTION

This invention relates generally to a device or apparatus for interconnecting electrical buses which connects various components of a computer system, and in particular to a device for interconnecting two Universal Serial Buses (USBs) together which includes power management features.

A typical personal computer system has a main central processing unit (CPU) enclosed within a housing and one or more peripheral devices, such as a keyboard, a mouse, a monitor, a modem or a printer connected to the housing and electrically connected to the CPU by a unique connector and an electrical bus, respectively. These different connectors and electrical buses include serial buses, parallel buses and RS-232 ports. Typically, each of these different buses had different signaling requirements and different connectors to the housing. For example, a parallel bus has a certain physical connector and communicates bits of data in parallel (i.e., a predetermined number of bits at the same time). In contrast, a serial bus may have a different physical connector and may transmit bits of data in a serial manner (i.e., one bit at a time).

In order to connect a keyboard, printer, monitor, modem or mouse to the personal computer, it was often necessary to use several different types of local electrical buses and associated ports, such as a serial port for a modem, a parallel port for the printer, a keyboard port and a mouse port. This leads to unnecessary complexity since each peripheral device may use a different bus. Therefore, a new universal serial bus (USB) was created to provide a standard interconnect for peripherals, and to facilitate connecting peripheral devices to the computer. The USB not only replaces the multiple cables and physical connectors typically needed with a single standardized connection system, it provides a standard electrical specification. The USB also permits peripheral devices to be connected and/or disconnected from the bus while the computer system is powered up which eliminates the need, with conventional buses, to power down and "re-boot" every time that a peripheral device is connected or disconnected. The USB further permits a peripheral connected to the USB to be detected and then a configuration process for the device, known as enumeration, may be commenced.

The USB standard also provides that a USB bus may be put into a suspended state if certain events occur. In particular, if there is no activity on the USB by the peripheral device for 3 milliseconds (ms), the peripheral device and the USB interprets this inactivity as a command to go into the suspended state. In the suspended state, according to the USB specification, the peripheral device connected to the USB may only draw a maximum current of 500 $\mu$A from the USB. The peripheral device may be awakened out of the suspended state when any activity on the USB occurs.

One of the challenges in producing a bus powered USB compatible peripheral devices is meeting the stringent 500 $\mu$A maximum suspend current limitation imposed on each bus powered USB peripheral device. In particular, in order to be recognized on the USB, the peripheral device must pull-up its D+ line to a local 3.3 volts supply through a 1.5 K$\Omega$ resistor which is known as a "1.5 k pull-up". Because the D+ line must also be pulled down to ground through a 15 k$\Omega$ resistor, the local 1.5 k pull-up circuit causes a current draw of 200 $\mu$A. Therefore, while in the suspended state, a peripheral device may only draw a maximum current of 300 $\mu$A (the 500 $\mu$A total minus the 1.5 k pull-up current).

The problem is that if two USBs are connected to a device and both USBs go into a suspended state at the same time, the current being drawn by the device would probably exceed the maximum suspended current limitation and would therefore not be USB compliant. Therefore, it is desirable to produce a device which enables two systems connected together through USB ports to not exceed the maximum suspended current limitation for each port. The USB-to-USB device may have a separate USB interface for each USB bus connected to it. The USB-to-USB device may be used to connect two computers together using their USB ports so that the computers may communicate with each other over the USB which is intended for the connection of peripherals. The problem of producing a USB-to-USB device is that this USB-to-USB device must still meet the stringent 500 $\mu$A maximum suspend current limitation for each "host" interface. Therefore, despite a 1.5 k pull-up within each interface for each USB (together drawing 400 $\mu$A), the USB-to-USB device must still meet the stringent suspend current limitations.

Thus, it is desirable to provide a device for interconnecting USBs which does not exceed the maximum suspend current limitation even when one or both USB are in the suspended state, and it is to this end that the present invention is directed.

SUMMARY OF THE INVENTION

In accordance with the invention, a USB-to-USB device is provided having a circuit for controlling the current consumed by the device from a suspended USB connected to the device in order to achieve a maximum suspend current of 500 $\mu$A. In particular, the device may have an interface circuit for each USB, wherein each interface circuit receives a power signal over its respective bus. Each USB interface may have a powered state in which the interface is receiving signals over the USB and a suspended state in which the interface is not receiving signals over the USB. To power the device, a circuit may switch between the power signal source from either USB interface depending on the states of that USB interface. In one example, if only one USB is connected to the USB-to-USB device, then that USB interface provides the current to the device. However, when that USB goes into a suspended state, the power management circuit may temporarily halt the clocks in the USB-to-USB device in order to meet the maximum suspend current limitation.

As another example, when both USBs are plugged into the USB-to-USB device and operational, the device may draw current from a default USB selected from either USB. However, when one of the USBs goes into a suspended state, the power management circuit may switch the current drawn by the device away from the suspended USB. If both USBs which are plugged into the device are suspended, then the power management circuit may temporarily halt the clocks in the USB-to-USB device until one of the USBs is no longer suspended.

Thus, in accordance with the invention, a device for interconnecting two universal serial buses having power management is provided. The device may include a first interface for connecting a first USB to the device wherein the first interface receives a first power signal, has an operational state when signals are being received over the first USB and has a suspended state when signals are not being received over the first USB for a predetermined period of time. The device may further include a second interface for connecting a second USB to the device wherein the second interface receives a second power signal over the second USB, has an operational state when signals are being received over the second USB and has a suspended state when signals are not being received over the second USB for a predetermined period of time. The device further includes a switch for switching between the first power signal and the second power signal to supply current to the device based on the states of the first interface and the states of the second interface in order to meet the maximum suspended state current limitation.

DETAILED DESCRIPTION OF A PREFERRED EMBODIMENT

The invention is particularly applicable to a power management circuit incorporated into a universal serial bus-to-universal serial bus device (USB-to-USB device) for enabling two USB interfaces to be connected while limiting the suspend current drawn by the USB-to-USB device connected to two USB interfaces and it is in this context that the invention will be described. It will be appreciated, however, that the device and method in accordance with the invention has greater utility.

Figure 1:
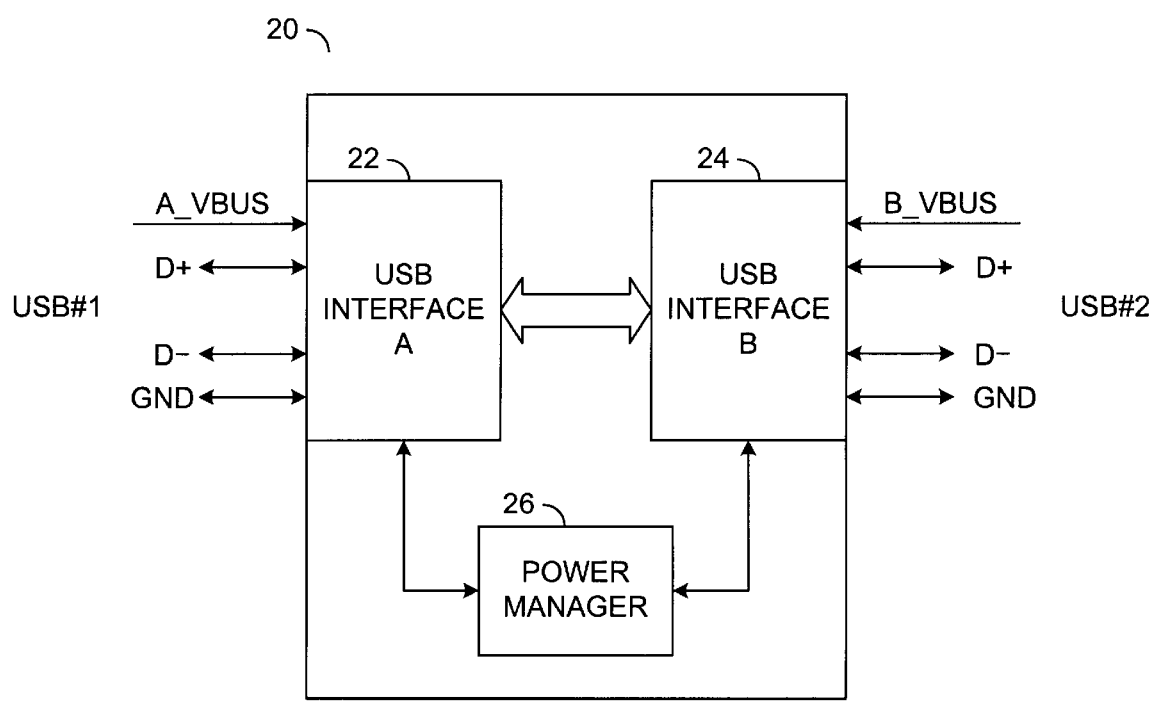
FIG. 1 is a diagram illustrating a USB-to-USB device.

FIG. 1 is a diagram illustrating a device 20, which may be referred to as a USB-to-USB device, for connecting a first universal serial bus (USB #1) to a second universal serial bus (USB #2). The USB-to-USB device, in the form shown in FIG. 1, permits two USBs to be interconnected for communicating so that data from one bus may be passed onto the other bus and vice-versa. For example, two personal computer systems (not shown) may be connected to and communicate with each other by connecting the USB ports of the personal computer systems to each other. As shown, the USB-to-USB device 20 may include a first interface circuit (USB Interface A) 22 which is connected to USB #1 and a second interface circuit (USB Interface B) 24 which is connected to USB #2. The interface circuits, as defined by the USB specification, may receive the incoming USB data and synchronize a local clock to the incoming USB data so that the data may be decoded. In addition, the interface circuits 22, 24 may be connected to each other using decoders (not shown) which decode the USB data based on the local clock so that data may pass between the two USBs to communicate data. Thus, although the USB is intended for the connection of peripherals, it may also be used to communicate data between computers.

Each USB (USB #1 or USB #2) includes a plurality of signal lines which may include a power signal line ($A_{13}VBUS$ or $B_{13}VBUS$), which may be 5 volts, a ground signal line (GND), a positive data signal line (D+) and a negative data signal line (D−). The positive data signal line may transmit a signal having a voltage between 0 and 3.3 volts while the negative data signal line may also transmit a signal having a voltage between 0 and 3.3 volts. The positive and negative data signal lines may communicate data and command signals over the USB, while the power signal may provide power to the peripheral devices connected to the USB. In this example, the USB-to-USB device 20 may be powered by the USB bus in that the USB-to-USB device 20 receives the current necessary to power the circuits in the USB-to-USB device 20 from the power signals ($A_{13}VBUS$ or $B_{13}VBUS$) of either of the USB as described in more detail below.

Therefore, it is necessary to ensure that the USB-to-USB device 20 does not draw more than the maximum suspend current (500 $\mu$A) from a USB in a suspended state. To accomplish this, the USB-to-USB device 20 may include a power manager 26 in accordance with the invention, as described in more detail below, which ensures that the USB-to-USB device 20 meets these maximum suspended current requirement. The power manager 26 may determine how to supply power to the USB-to-USB device 20 as well as both USB interfaces without exceeding the maximum suspended current limit, even when one or both of the USB interfaces in the device are commanded to go into the suspended state. In particular, the power manager 26 may select a source of power from either of the USBs depending on the states of the USBs. For example, if one USB is in a suspended state, the power manager 26 may draw current from the other active USB. If both USBs are in the suspended state, the power manager 26 may temporarily halt the clocks in the USB-to-USB device 20 to reduce the current below the maximum suspended current until one or both of the buses is no longer in a suspended state. Prior to describing the power manager 26 in more detail, the states of the USB-to-USB device 20 when connected to two USBs will now be described.

Figure 2:
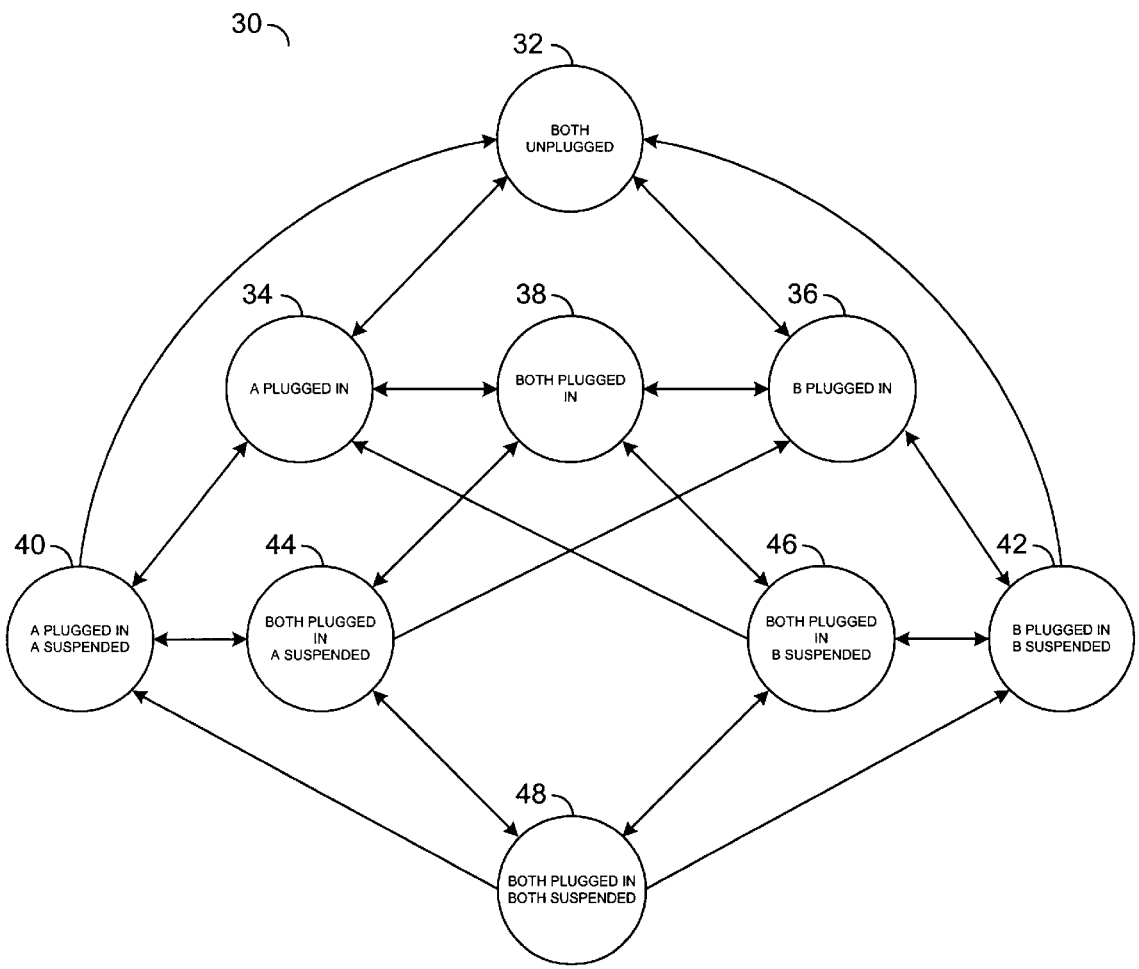
FIG. 2 is a state diagram illustrating the various possible states for the USBs connected to the USB-to-USB device of FIG. 1.

FIG. 2 is a state diagram 30 showing the various states that the USB-to-USB device 20 may be in depending on the states of each USB interface shown in FIG. 1. Each USB interface and bus may be in an "unplugged" state in which no USB bus is plugged into the interface, a "plugged in and operational" state in which a USB bus is plugged in to the interface and actively communicating data, and a "plugged in, but suspended" state in which the bus is plugged in, but is in a suspended state. As shown, a first state 32 of the USB-to-USB device 20 may be entered when both USB buses are unplugged from the USB-to-USB device. If only USB #1 of FIG. 1 is plugged in, the USB-to-USB device 20 enters a second state 34, but may return to the first state if USB #1 is unplugged. Similarly, if only the USB #2 is plugged in, the USB-to-USB device may enter a state 36. If both USBs are plugged in, the USB-to-USB device 20 enters a state 38. If one of the USBs is later unplugged, the USB-to-USB device may return to either state 34 or state 36.

If only USB #1 is plugged in, but it is in a suspended state, the USB-to-USB device enters state 40 whereas if only USB #2 is plugged in, but it is in a suspended state, the USB-to-USB device enters state 42. If both USB buses are plugged in, but only USB #1 is in a suspended state, the USB-to-USB device enters state 44 whereas the USB-to-USB device may enter state 46 if both buses are plugged in, but USB #2 is in a suspended state. Finally, if both USBs are plugged in and in a suspended state, the USB-to-USB device enters state 48. The states shown are the nine different states into which the USB-to-USB device may enter depending on the states of the USBs connected to the USB-to-USB device. As described below in more detail, the power manager may adjust the supply of current to the device 20 based on these states in order to ensure that the maximum suspend current limitation is not exceeded. With this understanding of the states of the USB-to-USB device, a more detailed description of the power manager in accordance with the invention will now be provided.

Figure 3:
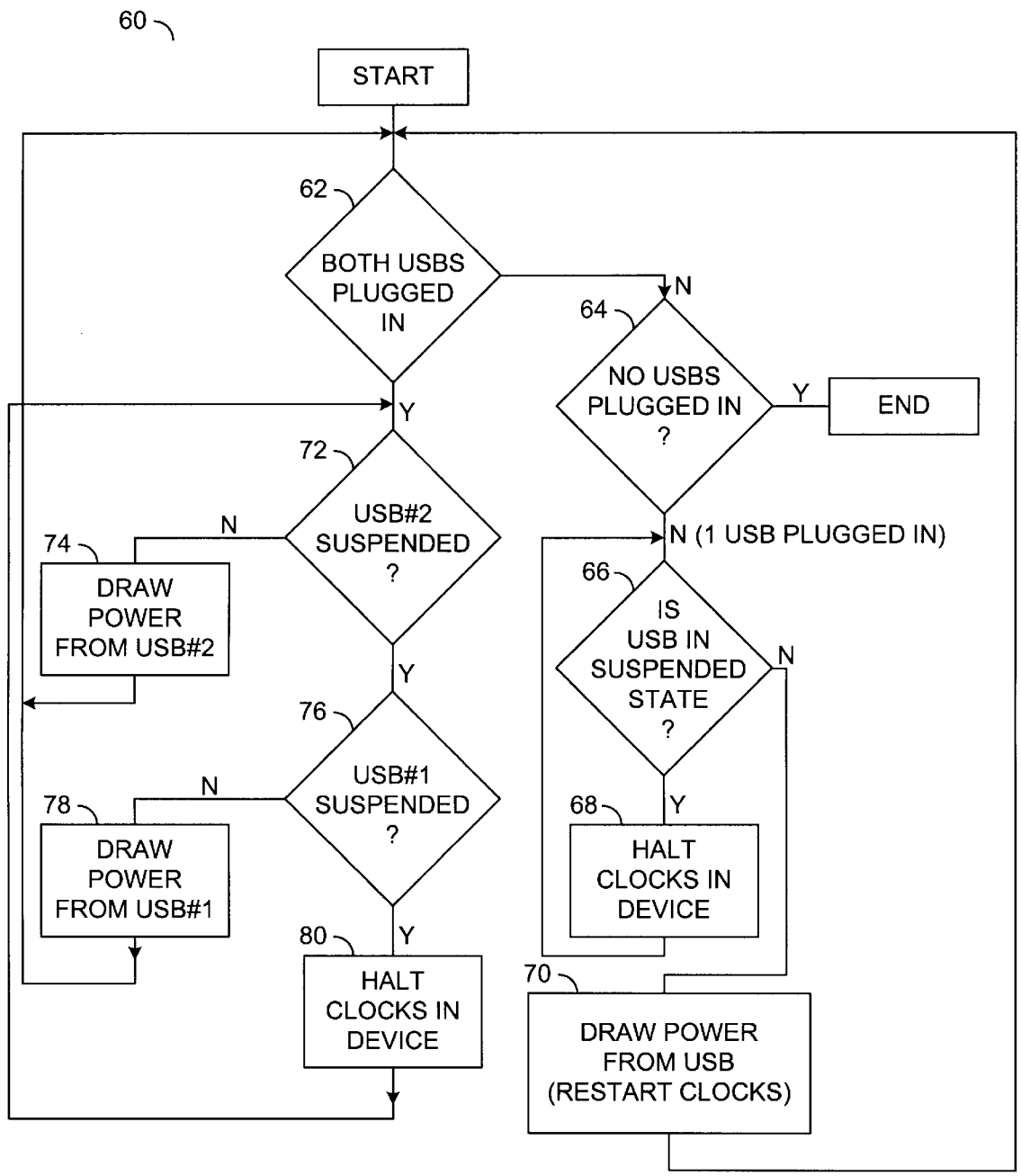
FIG. 3 is a flowchart illustrating a method for power management in a USB-to-USB device in accordance with the invention.

FIG. 3 is a flowchart illustrating a method 60 for power management in a USB-to-USB device in accordance with the invention. The method will be described using FIG. 3 and the Table 1 below.

TABLE 1

| USB #1 Plugged In | USB #2 Plugged In | USB #2 In Suspend | Power Supplying Bus |
|---|---|---|---|
| No | Yes | X | USB #2 |
| Yes | No | X | USB #1 |
| Yes | Yes | No | USB #2 |
| Yes | Yes | Yes | USB #1 |

In this table, USB #2 is described as the default power supply (i.e., if both USBs are plugged in and not in a suspended state, then USB #2 will supply the power to the USB-to-USB device). However, it should be noted that the invention is not limited to the selection of a particular default power supply since either USB #1, USB #2 or both USBs (load sharing) may be used as the default power supply.

The method 60 starts at step 62 in which the power manager determines if both USBs are plugged into the USB-to-USB device. If both USBs are not plugged into the USB-to-USB device, the power manager then determines, in step, whether any USBs are plugged into the USB-to-USB device and the method ends if the there are no USBs plugged into the USB-to-USB device since the USB-to-USB device cannot receive any power to operate. If at least one USB is plugged into the USB-to-USB device, then the power manager may determine if the plugged in USB is in a suspended state in step 66.

If the USB is in a suspended state, the USB-to-USB device may only draw 500 $\mu$A of current from the USB bus. Therefore, to meet this maximum suspended current limitation, the power manager may halt the clocks in the interface circuits 22, 24 of the USB-to-USB device as shown in FIG. 1, in step 68 and draw the current from the suspended USB. The method then loops back to step 66 so that the power manager may retest to determine if the USB is in the suspended state. In this manner, the clocks of the USB-to-USB device are temporarily halted to reduce the total current being drawn from the USB until the USB is no longer in the suspended state. If the USB is not in the suspended state, then in step 70, the power manager may draw whatever current it requires from the USB bus and restart the clocks in the interfaces if necessary. The method then loops back to step 62 to again poll the USBs to determine which and how many USBs are currently plugged into the USB-to-USB device. Thus, when only one USB is plugged into the USB-to-USB device, the power manager either draws current from the USB if it is active or temporarily halts its clocks if the USB is in the suspended state.

Returning to step 62, if the power manager detects that both USBs are plugged in, then in step 72, the power manager determines if USB #2 (i.e., the default power supply in this example) is in a suspended state. If USB #2 is not in a suspended state, then in step 74, the USB-to-USB device draws current from the USB #2 power supply and the method loops back to step 62. If USB #2 is in a suspended state, then the power manager determines if USB #1 is also in a suspended state in step 76. If USB #1 is not in a suspended state (but USB #2 is in a suspended state), then in step 78, the USB-to-USB device draws its current from USB #1 and the method loops back to step 62. If both USBs are in suspended states, then simply switching the current draw between the two buses is not sufficient since the USB-to-USB device must still draw less than 500 $\mu$A of current from either of the USBs. Therefore, in step 80, the power manager may temporarily halt the clocks of the interfaces 22, 24 (see FIG. 1) until one of the USBs is no longer in the suspended state. While both USBs are in the suspended state, USB #1 may supply the power as shown in Table 1.

However, to decrease the current load on USB #1 when both USBs are in a suspended state and avoid exceeding the maximum suspend current, the power manager may draw the current for the USB #2 pull-up from USB #2 and then draw the current for USB #1 pull-up and for the rest of the USB-to-USB device from USB #1 as described below with reference to FIG. 4. The method then loops back to step 72 in which the power manager determines if USB #2 is still in the suspended state.

In accordance with this method, the power manager may poll each USB to determine which USBs are plugged in and to determine which are in a suspended state in order to determine where the USB-to-USB device may draw power from at any given time. To account for both normal operation and the suspended state, the power manager may implement a two stage approach (e.g., first switching the current load between the USBs and then temporarily halting the clocks of the interfaces) to ensure that the maximum suspended state current is not exceeded at any time. Now, the circuitry of the power manager and its operation will be described.

Figure 4:
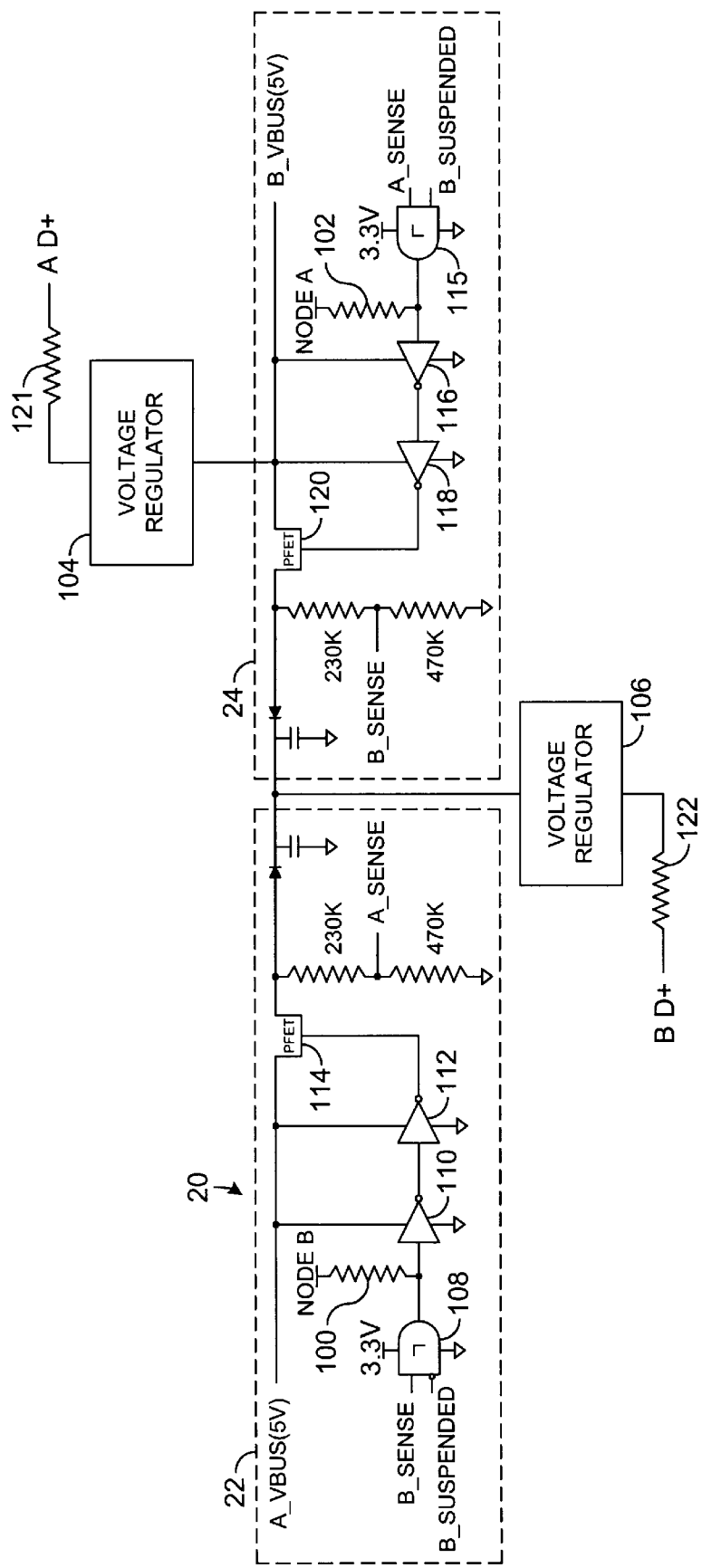
FIG. 4 is a diagram illustrating details about the USB-to-USB device and power management circuit in accordance with the invention.

FIG. 4 is a diagram illustrating the USB-to-USB device 20 incorporating the power manager in accordance with the invention. In the USB-to-USB device 20, there are three main power consuming components which combined must draw no more than 500 $\mu$A of current when the USB providing the power is in a suspended state. These three components include a 1.5 k pull-up resistor 121 for USB interface A (22) which draws 200 $\mu$A, the 1.5 k pull-up resistor 122 for USB interface B (24) which also draws 200 $\mu$A, and the current to power the rest of the USB-to-USB device. Therefore, normally, when both USBs are plugged in and both USBs go into a suspended state, USB #1 (see Table 1) must supply 400 $\mu$A for the two 1.5 k pull-ups 121, 122 so that only 100 $\mu$A is left to power the rest of the USB-to-USB device when the clocks are stopped.

In FIG. 4, a signal "b_sense" is high when a USB bus is plugged into USB interface B, a signal "b_suspended" is high when the USB bus plugged into USB interface B is in a suspended state, and a signal "a_sense" is high when a USB bus is plugged into USB interface A. The b_suspended signal is generated by several logic gates which are not shown while the a_sense and b_sense signals are voltages between two resistors as shown. In order to meet the suspended current budget when both USBs are in a suspended state, the USB-to-USB device 20 may include a voltage regulator 104 which supplies power to the 1.5 k pull-up for USB interface circuit B 24 from the B_VBUS signal line. Therefore, the total current burden on USB interface A 22 during a period of time when both USBs are in a suspended state is reduced in that the A_VBUS power signal must only support 1.5 k pull-up A 121 and the rest of the device. A second voltage regulator 106 attached to the B_VBUS signal line may therefore supply power to the 1.5 k pull-up A 121 and the rest of the device 20. If the clocks are temporarily halted as described above, there may be 300 μA of current to be distributed between the pull-up A 121 and the device 20.

In operation, if the b_sense signal is high and the b suspended signal is not high (i.e., USB B is plugged in, but not suspended), then the output of an AND gate 108 goes high and is amplified by two inverters 110, 112 and connected to the gate of a p-type field effect transistor (PFET) 114. A high signal applied to the gate of the PFET turns the PFET off so that B_VBUS is supplying the power for the device 20. If a_sense is high and b suspend is high (i.e., USB A is plugged in and USB B is in a suspended state), then the output of another AND gate 115 goes high and is amplified by two inverters 116, 118. The signal is fed to the gate of a second PFET 120. The high signal applied to the gate of the PFET 120 turns the PFET off so that the A_VBUS signal supplies the power to the device 20 with the exception that the regulator 104 continues to supply power to the pull-up B. Now, in accordance with another aspect of the invention, each device connected to the USB may want control over when the peripheral device should temporarily halt its clocks and/or switch power and such an embodiment will now be described.

Figure 5:
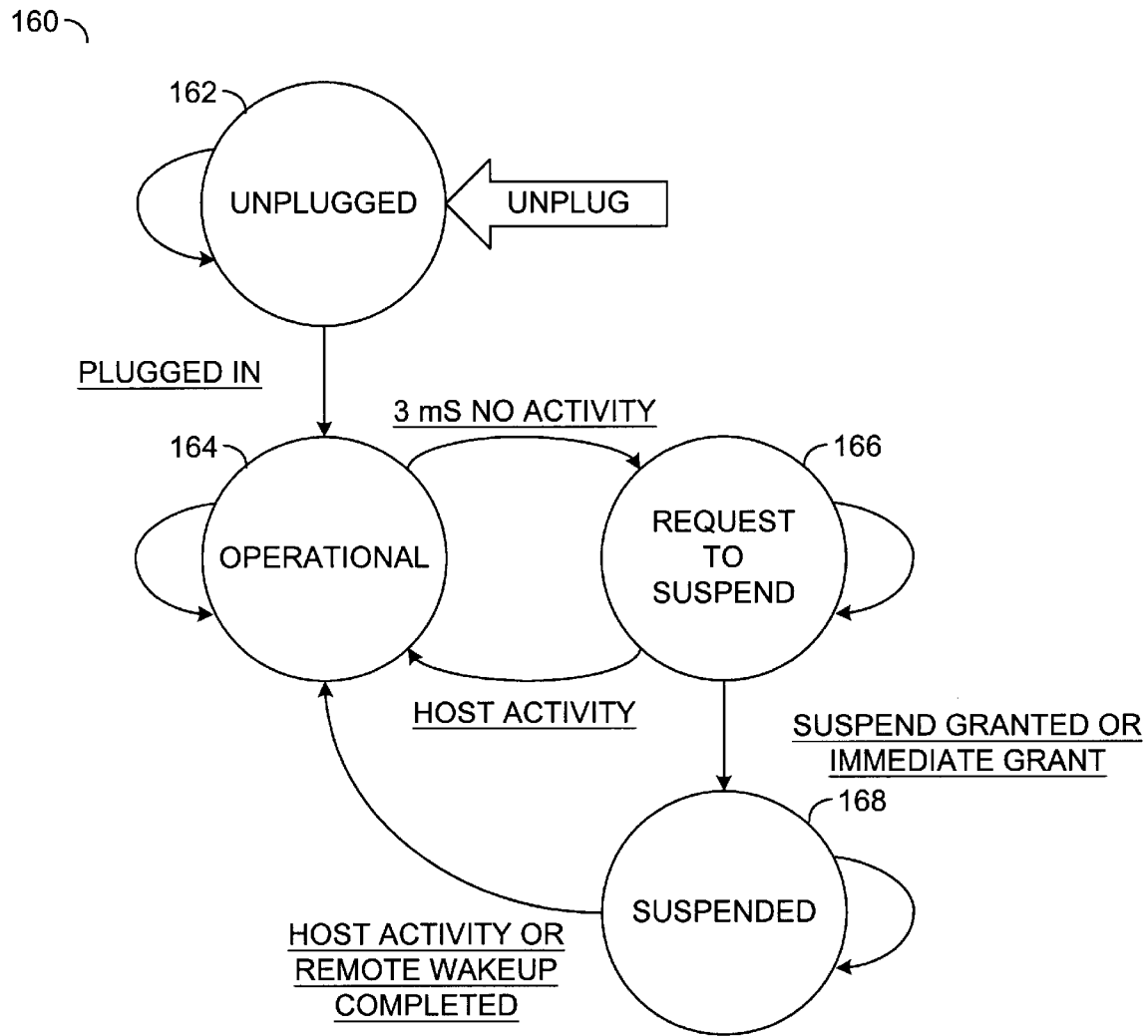
FIG. 5 is a state diagram illustrating the states for each interface within the USB-to-USB device.

FIG. 5 is a state diagram illustrating a method 160 in accordance with another aspect of the invention for a peripheral device driver to coordinate/control the power manager of the USB-to-USB device. In particular, the drivers may desire to control the temporary halting of the clocks and/or the switching of the power. To accomplish this level of control, the power manager and the USB-to-USB device may request the permission to go into the suspended state from the opposite buses device driver as soon as the USB-to-USB device detects a suspend state on either of the USBs connected to the USB-to-USB device.

The state diagram shows the states for each interface within the device 20. As shown, each USB interface in the USB-to-USB device may be in an unplugged state 162 in which the USB is not connected to the USB-to-USB device. The interface may remain in the unplugged state until a USB is plugged into the USB interface. When a USB is plugged in, the interface may enter an operational state 164 and remain in that state as long as the USB is active. If, for a predetermined period of time of the order of 3 ms, there is no activity on the USB, then the interface may enter a Request to Suspend state 166. If there is then activity on the USB, the interface may return to the operational state 164.

When the interface enters the request to suspend state 166, it may either 1) immediately go into a suspended state 168 without having been granted permission by the driver attached to the other interface; or 2) go into the suspend state 168 only after the driver attached to the other interface has been notified of the request to suspend and the driver has granted the request to suspend or the interface may immediately enter the suspended state as described in more detail below. If some activity occurs on the USB bus while the USB is suspended or a remote wake-up process occurs, the interface may go back to the operational state 164. Now, a method for obtaining suspend permission in accordance with the invention will be described.

To increase the flexibility of the device 20 in accordance with the invention, each USB interface may request permission from the other device driver connected to the other interface to enter the suspended state so that the other device driver may prevent entry into the suspended state for some reason. In particular, the invention negotiates the Request to Suspend state 166 differently depending on the state of the device driver connected to the other interface circuit. To accomplish this, there may be four mode bits which are set by each interface to indicate the current state of the each interface (i.e., Unplugged, Operational, Request To Suspend or Suspended) when it is requesting to go into the suspended state. Each mode bit for the interface may tell the other interface whether it needs permission to go into the suspended state or not. For example, if the mode bits indicate that the other interface is operational, the interface may not need permission to go into the suspended state.

When USB devices are plugged into both interfaces, the only time when the device 20, in accordance with this embodiment of the invention, may temporarily halt the clocks are when both interfaces are in the suspended state. By permitting each driver to control whether or not it wants to grant permission to the other interface to go into the suspended state, the peripheral device driver has the ability to block the device 20 from temporarily halting the clocks. As another example, if it is determined that power switching between the two interfaces is undesirable for a particular system, then the mode bits may be set to always require driver permission to go into the suspended state and then never grant the permission. If the suspended state cannot be entered, then from Table 1 above, USB #2 can never go into the suspended state and therefore, the power supply of the device 20 will always remain with USB #2.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A device for interconnecting two universal serial buses, the device comprising:
    a first interface for connecting to a first USB, said first interface receiving a first power signal over the first USB, the first USB having (i) an operational state when signals are being received over the first USB and (ii) a suspended state when signals are not received over the first USB for a predetermined period of time;
    a second interface for connecting to a second USB, said second interface receiving a second power signal over the second USB, the second USB having (i) an operational state when signals are being received over the second USB and (ii) a suspended state when signals are not received over the second USB for a predetermined period of time; and
    a power manager configured to (i) determine a source of current for the device selected from the first power signal and the second power signal based on the states of the first and second USBs in order to meet the maximum suspended state current limitation and (ii) supply current to the selected device when the first interface is in the operational state and the second device is in the suspend state.

2. The device of claim 1, wherein the power manager is further configured to halt one or more clocks in the first and second interfaces when the first and second interfaces are both in the suspended state.

3. The device of claim 1, wherein said power manager is further configured to select the second power signal when the first USB is not plugged into the first interface and the second interface is in the operational state.

4. The device of claim 3, wherein said power manager is further configured to temporarily halt the one or more clocks in the second interface until the second interface exits the suspended state.

5. The device of claim 1, wherein the power manager is further configured to select the first power signal to (i) supply current to the device and (ii) provide current to a pull-up resistor attached to the second USB to reduce the current load on the first USB when the first and second interfaces are both in the suspend state.

6. The device of claim 5, wherein the current is generated in response to a voltage regulator.

7. The device of claim 1, further comprising:
a control circuit configured to control (i) switching the power between the first and second interfaces and (ii) halting the one or more clocks in the first and second interfaces.

8. The device of claim 7, wherein each interface comprises:
a request circuit configured to request permission to enter the suspended state.

9. A method for interconnecting two universal serial buses, comprising the steps of:
receiving a first power signal over a first USB, the first USB having (i) an operational state when signals are being received over the first USB and (ii) a suspended state when signals are not received over the first USB for a predetermined period of time;
receiving a second power signal over a second USB, the second USB having (i) an operational state when signals are being received over the second USB and (ii) a suspended state when signals are not received over the second USB for a predetermined period of time; and
determining the source of current for the device selected from the first power signal and the second power signal based on the states of the first and second USBs in order to meet the maximum suspended state current limitation, wherein said determining step comprises supplying current when the first USB is in the operational state and the second USB is in the suspended state.

10. The method of claim 9, wherein the determining step further comprises halting one or more clocks in the first and second USBs when the first and second USBs are both in the suspended state.

11. The method of claim 9, wherein when the first USB is not plugged in and the second USB is in the operational state, the determining step comprises selecting the second power signal to supply current.

12. The method of claim 11, wherein when the second USB is in the suspended state, the determining step further comprises temporarily halting the clocks in the second USB until the second USB exits the suspended state.

13. The method of claim 9, wherein when the first and second USBs are both in the suspended state, the determining step comprises selecting the first power signal to supply current to the device and providing current to a pull-up resistor attached to the second USB to reduce the current load on the first USB.

14. The method of claim 13, wherein said providing step comprises using a voltage regulator.

15. The method of claim 9, further comprising:
controlling the determination of the current to control switching the power between the first and second USBs; and
halting the clocks in the first and second USBs.

16. The method of claim 15, wherein said determining step comprises:
requesting permission to enter the suspended state.

17. A device for interconnecting two universal serial buses comprising:
means for connecting to a first USB, said means (i) receiving a first power signal and (ii) having (a) an operational state when signals are being received over the first USB and (b) a suspended state when signals are not received over the first USE for a predetermined period of time;
means for connecting to a second USB, said means (i) receiving a second power signal and (ii) having (a) an operational state when signals are being received over the second USB and (b) a suspended state when signals are not received over the second USB for a predetermined period of time; and
means for determining a source of current for a device selected from the first power signal and the second power signal, said current based on the states of the first and second USBs in order to meet the maximum suspended state current limitation, wherein said current is supplied to the selected device when (i) the means for connecting to a first USB is in the operational state and (ii) the means for connecting to a second USB is in the suspend state.

18. The device of claim 17, wherein when (i) said means for connecting to the first USB is in the operational state and (ii) said means for connecting to the second USB is in the suspended state, said device further comprises:
means for supplying current to the device from the first power signal.

19. The device of claim 17, wherein when (i) the means for connecting to the first USB is not plugged in and (ii) the means for connecting to the second USB is in the operational state, said device further comprises:
means for selecting the second power signal to supply current to the selected device.

20. The device of claim 17, wherein when the means for connecting to the second USB is in the suspended state, said device further comprises:
means for temporarily halting one or more clocks in said second USB until the suspended state is exited.

* * * * *